United States Patent [19]

Lipinski et al.

[11] Patent Number: 4,798,675

[45] Date of Patent: Jan. 17, 1989

[54] CORROSION INHIBITING COMPOSITIONS CONTAINING CARBOXYLATED PHOSPHONIC ACIDS AND SEQUESTRANTS

[75] Inventors: Richard J. Lipinski, Aurora; Kelvin Y. Chang, Solon, both of Ohio

[73] Assignee: The Mogul Corporation, Chagrin Falls, Ohio

[21] Appl. No.: 110,138

[22] Filed: Oct. 19, 1987

[51] Int. Cl.$^4$ ............................................. C02F 5/14
[52] U.S. Cl. ................................... 210/700; 210/699; 252/180; 252/389.22; 252/389.23; 422/15; 422/17
[58] Field of Search .............. 252/180, 389.22, 389.23; 422/15, 17; 210/699, 700

[56] References Cited

U.S. PATENT DOCUMENTS

| | | | |
|---|---|---|---|
| 3,351,558 | 11/1967 | Zimmerer | 252/137 |
| 3,505,238 | 4/1970 | Liddell | 252/180 |
| 3,600,470 | 8/1971 | Lewis | 558/124 |
| 3,639,645 | 2/1972 | Miller et al. | 252/180 |
| 3,666,664 | 5/1972 | Lorenc et al. | 252/180 |
| 3,699,047 | 10/1972 | Petry, Jr. | 252/175 |
| 3,738,806 | 6/1973 | Feiler, Jr. | 422/15 |
| 3,751,372 | 8/1973 | Zecher | 252/181 |
| 3,806,459 | 4/1974 | Petrey, Jr. | 252/82 |
| 3,849,328 | 11/1974 | Schievelbein et al. | 252/180 |
| 3,901,651 | 8/1975 | Benner et al. | 252/181 |
| 3,925,245 | 12/1975 | Harris et al. | 252/181 |
| 3,933,427 | 1/1976 | Bohnsack et al. | 252/180 |
| 4,026,815 | 5/1977 | Kallfass et al. | 252/180 |
| 4,033,896 | 7/1977 | Mitchell et al. | 252/181 |
| 4,042,324 | 8/1977 | Auel et al. | 252/180 |
| 4,052,160 | 10/1977 | Cook et al. | 252/180 |
| 4,138,353 | 2/1979 | Lipinski | 252/181 |
| 4,209,487 | 6/1980 | Hogue et al. | 422/12 |
| 4,217,216 | 8/1980 | Lipinski | 252/181 |
| 4,246,030 | 1/1981 | Lipinski | 106/14.12 |
| 4,277,359 | 7/1981 | Lipinski | 252/175 |
| 4,303,546 | 12/1981 | Waegerle | 252/180 |
| 4,437,898 | 3/1984 | Drosdziok et al. | 106/14.12 |
| 4,446,028 | 5/1984 | Becker | 210/697 |
| 4,606,890 | 8/1986 | Fisk | 422/15 |
| 4,689,200 | 8/1987 | Cook et al. | 252/180 |
| 4,708,805 | 11/1987 | D'Muhala et al. | 210/698 |

Primary Examiner—Robert A. Wax
Attorney, Agent, or Firm—Pearne, Gordon, McCoy & Granger

[57] ABSTRACT

Corrosion inhibiting compositions for inhibiting corrosion and the deposition of mineral scale on metal in aqueous systems contain sequestrants such as carboxylic acids, phosphates, or optionally sulfur containing lignosulfonates, as well as carboxylated phosphonic acids of the formula

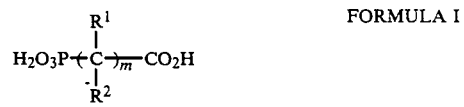

FORMULA I

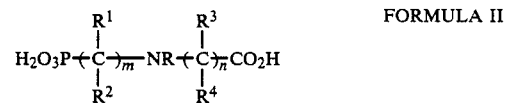

FORMULA II wherein m is from 1 to about 6, wherein n is from 0 to about 6, wherein R is —H, -alkyl, -alkenyl, -alkynyl, -aryl, -alkyl substituted aryl, -cycloalkyl, -methylene phosphonic acid, or -methylene carboxylic acid, and wherein $R^1$, $R^2$, $R^3$ and $R^4$ independently is —H, -alkyl, -aryl, -alkyl substituted aryl, —OH, —SH, —NH$_2$, —PO$_3$H$_2$, —CH$_2$PO$_3$H$_2$, —CO$_2$H, —CH$_2$CO$_2$H, halogen, or —SO$_3$H. The composition can also contain other corrosion inhibiting compounds such as azoles, molybdates, and the like.

14 Claims, No Drawings

CORROSION INHIBITING COMPOSITIONS CONTAINING CARBOXYLATED PHOSPHONIC ACIDS AND SEQUESTRANTS

FIELD OF THE INVENTION

The present invention relates to the utilization of sequestrants in combination with carboxylated phosphonic acids in aqueous solutions to inhibit corrosion and the deposition of mineral scale on metals.

BACKGROUND ART

Heretofore, numerous corrosion inhibiting compositions have been utilized to inhibit the buildup of scale or corrosion on metal objects in an aqueous system.

For example, U.S. Pat. No. 3,505,238 to Liddell relates to salts of amino methylene phosphonates which are added to saline water alone or in combination with one or more anti-foam agents, water soluble polymers, tannins, lignins, and deaerating materials to inhibit the deposition of scale on water evaporators.

U.S. Pat. No. 3,351,558 to Zimmerman relates to detergent compositions containing organic phosphonate corrosion inhibitors and various other additives.

U.S. Pat. No. 3,600,470 to Lewis relates to the production of hydroxy substituted phosphonates which are produced by the reaction of a halohydrin with an aliphatic or aromatic phosphite.

U.S. Pat. No. 3,639,645 to Miller relates to scale inhibiting compositions such as an alkylene polyamino methylene phosphonic acid. A polycarboxylic acid can also be utilized.

U.S. Pat. No. 3,699,047 to Petrey relates to a corrosion inhibitor for metals contained in an aqueous medium containing a divalent metal ion, a chelating agent, and a modified lignosulfonate polymeric material.

U.S. Pat. No. 3,666,664 to Lorenc et al. relates to a composition for inhibiting scale formation on metal objects containing nitrilotriacetic acid and a specific organophosphonate.

U.S. Pat. No. 3,738,806 to Feiler relates to a method for inhibiting corrosion of metals in contact with an aqueous medium utilizing a complex made from an organo-phosphorus ligand and a metal ion such as zinc, etc. A lignosulfite can be utilized as a binder.

U.S. Pat. No. 3,751,372 to Zecher relates to a corrosion inhibitor for metals in an aqueous medium which contain various polyphosphates or a phosphorylated polyols and organophosphonic acids. Citric acid can be utilized as an additive.

U.S. Pat. No. 3,806,459 to Petrey et al. relates to a composition for the inhibition of scale on metallic surfaces in contact with water wherein the composition contains a phosphonic acid and an aminoacetic acid.

U.S. Pat. No. 3,901,651 to Benner et al. relates to the inhibition of metal parts in an aqueous system by utilizing a composition containing a water soluble phosphone or phosphine, a water soluble sulfonated lignin and a water soluble cation.

U.S. Pat. No. 3,925,245 to Harris relates to a composition for inhibiting the corrosion of metal surfaces in contact with an aqueous medium containing an inorganic nitrite and an amino alkyl-phosphonic acid.

U.S. Pat. No. 4,026,815 to Kallfass et al. relates to a composition for inhibiting corrosion of metals in an aqueous medium utilizing a phosphonocarboxylic acid and various other compounds including a lignin sulfonate.

U.S. Pat. No. 4,033,896 to Mitchell et al. relates to corrosion inhibitors along with various additives such as sequestering agents.

U.S. Pat. No. 4,052,160 to Cook et al. relates to a method of treating an aqueous system to inhibit the corrosion of metals in contact therewith utilizing a phosphonic acid and other additives including precipitating agents such as, sequestering agents.

U.S. Pat. No. 4,138,353 to Lipinski relates to a corrosion inhibiting composition wherein effective amounts of citric acid or other compounds are utilized in association with an amino methylene phosphonic acid or a derivative thereof.

U.S. Pat. No. 4,209,487 to Hogue relates to 1,2-ethane diphosphonates in association with various compounds including tannins, lignins, lignin sulfonates, and the like.

U.S. Pat. No. 4,217,216 to Lipinski relates to corrosion inhibiting compounds containing an effective amount of at least one aminomethylene phosphonic acid.

U.S. Pat. No. 4,246,030 to Lipinski relates to corrosion inhibiting compositions containing a water soluble carboxylic acid, an amino alkylene phosphonic acid, and other inhibitors such as azoles and the like.

U.S. Pat. No. 4,303,546 to Waegerle relates to corrosion inhibiting compounds containing hydroxy alkane diphosphonic acids and the like which can be utilized in association with polyhydroxy acids such as gluconic acid.

U.S. Pat. No. 4,437,898 to Drosdziok et al. relates to corrosion inhibiting compositions containing a plurality of compounds including various complexed phosphonic acids.

U.S. Pat. No. 4,446,028 to Becker relates to corrosion inhibiting compounds containing a water soluble isopropenylphosphonic acid copolymer composition.

U.S. Pat. No. 4,606,890 to Fisk relates to a process for inhibiting corrosion on metal surfaces in contact with water by treating said surfaces with 2-hydroxy-phosphonoacetic acid.

The above patents do not recognize the use of a sequestrant in association with a carboxylated phosphonic acid.

SUMMARY OF THE INVENTION

It is an aspect of the present invention to provide a corrosion inhibiting composition which contains a water soluble carboxylated phosphonic acid and a sequestrant. The sequestrants are generally a phosphate, a sulfur containing lignosulfonate, or a water soluble carboxylic acid or the salt thereof which is desirably free of nitrogen atoms. Unexpected results with regard to corrosion inhibiting and reduction of mineral deposits generally formed on the surface of metals such as iron, steel, copper, brass, and aluminum in aqueous systems are obtained. Other corrosion inhibiting compounds such as azole, molybdate, and the like can also be utilized.

DETAILED DESCRIPTION

A composition and process for inhibiting corrosion of metals in aqueous solutions and to prevent the deposition of mineral scale thereon is provided. The composition generally comprises a carboxylated phosphonic acid of a specific formulation and sequestrants.

The carboxylated phosphonic acid can be represented by the following formulas:

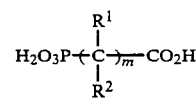
FORMULA I

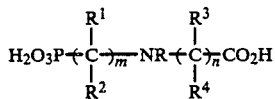
FORMULA II wherein m is from 1 to about 6, preferably from 1 to 4, wherein n is from 0, i.e., non-existent, to about 6, and preferably from 0 to 4. R is —H, an alkyl having from 1 to 12 carbon atoms and preferably from 1 to 4 carbon atoms, such as methyl, an alkenyl having from 2 to 12 carbon atoms with from 2 to 4 carbon atoms being preferred, an alkynyl having from 2 to 12 carbon atoms with from 2 to 4 carbon atoms being preferred, an aryl or an alkyl substituted aryl having from 6 to 15 carbon atoms and preferably from 6 to 12 carbon atoms, a cycloalkyl having from 3 to 16 carbon atoms and preferably from 5 to 12 carbon atoms, methylene phosphonic acid, or methylene carboxylic acid. $R^1$, $R^2$, $R^3$, and $R^4$, independently is hydrogen, an alkyl having from 1 to 12 carbon atoms and preferably from 1 to 4 carbon atoms, an aryl or an alkyl substituted aryl having from 6 to 15 carbon atoms and preferably from 6 to 12 carbon atoms, —OH, —SH, —NH$_2$, —PO$_3$H$_2$, —CH$_2$PO$_3$H$_2$, —CO$_2$H, —CH$_2$CO$_2$H, a halogen, —SO$_3$H. The groups of —H, —OH, and —PO$_3$H$_2$ are preferred. Examples of preferred compounds of Formula I include hydroxy phosphono acetic acid (HPA) or 2-phosphonobutane-1,2,4-tricarboxylic acid (PBTC). Examples of suitable compounds of Formula II include carboxylic propyleneamino di(methylenephosphonic acid), carboxylic methyleneamino di(methylenephosphonic acid), and carboxylic ethyleneamino di(methylenephosphonic acid). Various combinations of the above compounds can be utilized. The amount of the carboxylated phosphonic acids utilized in association with the water to be treated is from about 0.2 to about 100 parts by weight per one million parts by weight of water and desirably from about 2 to about 30 parts by weight per one million parts by weight of water.

One class of sequestrants utilized in the present invention can generally be defined as water soluble carboxylic acids and/or the alkali metal salts thereof, for example, sodium, lithium or potassium. This class of sequestrants desirably does not contain nitrogen atoms therein. Another class of sequestrants are various phosphate compounds which are generally water soluble. Another but optional class of sequestrants are the various high sulfur containing lignosulfonates. Such lignins are often referred to as dispersing lignins inasmuch as they tend to solubilize and hence inhibit scale buildup of various materials such as calcium carbonate, calcium sulfate, calcium phosphate, and the like. By the term "high sulfur containing" it is meant a lignin which contains a sulfur content of at least 6 percent to about 12 percent and preferably from about 7 percent to about 10 percent by weight based upon the total weight of the lignin. Such sulfonated lignins are generally well known to the art and to the literature and hence conventional high sulfur containing lignosulfonates can be utilized. Examples of such sequestrants include citric acid, tartaric acid, tetraphosphate, gluconic acid, glucoheptonic acid, pyrophosphate, tripolyphosphate, N,N-di(2-hydroxyethyl)glycinate, various high sulfur containing (6 to 12 weight percent, preferably 7 to 10 weight percent) lignosulfonates such as Kelig 100 produced by Reed Lignin of Greenwich, Conn., and the like. Tartaric acid, citric acid, and gluconic acid are preferred. The amount of the various sequestrants or combinations thereof is from about 0.1 to about 100 parts by weight per million parts by weight of water treated and preferably from about 2 to about 30 parts by weight per million parts by weight of water.

The combination of the carboxylated phosphonic acids and the sequestrants have been found to impart unexpected and improved corrosion inhibition and reduce scale buildup on metals located in aqueous systems. It is noted, however, that various conventional organic inhibitors can also be utilized. Thus, various azoles can be utilized in amounts of from about 0 to about 50 parts by weight, desirably from about 0.1 to about 30 parts by weight and preferably from about 0.2 to about 10.0 parts by weight per million parts by weight of water which is to be treated. Examples of various suitable azoles include the triazoles such as benzotriazole, tolyltriazole, and various other known azoles such as pyrazoles, imidazoles, oxazoles, thiazoles and combinations thereof. The triazoles particularly useful include the water-soluble 1,2,3-triazoles or a substituted 1,2,3-triazole such as benzotriazole, tolyltriazole, 4-phenyl-1,2,3-triazole, 1,2-naphthatriazole 4-nitro benzotriazole, etc. The pyrazoles include any of the water-soluble compounds such as 3,5-dimethyl pyrazole, 6-nitroindazole, 4-benzyl pyrazole, and the like. The imidazoles include the water-soluble compounds such as benzimidazole, 5-methylbenzimidazole, 2-phenyl imidazole; 4-methyl imidazole and the like. The oxazoles include any water-soluble compound such as the 2-mercaptoxazole; 2-mercaptobenzoazole, etc. The thiazoles include 2-mercaptothiazole, 2-mercaptobenzothiazole, benzothiazole, etc. Azoles are generally utilized in aqueous systems containing copper or alloys thereof, for example brass, in order to prevent tarnishing thereof.

Other compounds can also be utilized in the composition of the present invention as corrosion inhibiting compounds. Such compounds are well known to the art and to the literature and include the various metal molybdates. When utilized, the amount of the molybdates range from about 1 to about 30 parts by weight and preferably from about 2 to about 15 parts by weight per million parts by weight of water. Other metal compounds include the various sodium metal salts, the various zinc metal salts, and the various potassium metal salts, of nitrates, nitrites, silicates, carbonates, phosphates, polyphosphates, phosphonates, oxides, and the like, as for example sodium silicate, sodium nitrate, potassium nitrate, zinc oxide, zinc phosphate, and the like.

In order to reduce, abate and prevent scale formation which is often encountered in aqueous systems where water is vaporized, various polymeric dispersing agents can be utilized. Some of the preferred polymeric dispersing agents useful in the treatment of water in combination with the corrosion inhibiting compositions of this invention include polymers, copolymers, and terpolymers of acrylic acid, acrylamide, methacrylic acid, various hydrolyzed polyacrylonitriles, and the water-soluble salts thereof. Other monomers which may be used for the preparation of the polymeric dispersing agents include polymers derived from maleic acid, maleic anhydride, itaconic acid, aconitic acid, nadic anhydride, vinyl acetate, vinyl methyl ether, etc. These water-soluble polymers are used as dispersants in aqueous systems in combination with the corrosion inhibiting composition of this invention in comparatively small amounts, e.g. amounts as low as 1 part by weight to in excess of 30 parts by weight per million parts by weight of water, depending on the condition of the water and the type of water system being treated.

In addition to the above compounds, other additives may be contained in the corrosion inhibiting composition of the present invention such as biocides which inhibit the growth of algae, bacteria, fungus, and the like.

Inasmuch as all of the compounds utilized in the present invention are generally water soluble, the corrosion inhibiting composition of the present invention can be made up as a concentrate containing the various sequestrants, the carboxylated phosphonic acids, and the like. The concentrate can be added to the water to be treated when desired. Alternatively, the various compounds of the present invention can be mixed with an inert material such as sodium carbonate, sodium sulfate, and the like to form a powder and the powder then fed to an aqueous system when desired.

The invention will be better understood by reference to the following examples.

In the following tables HPA stands for hydroxy phosphono acetic acid and PBTC stands for 2-phosphonobutane-1,2,4-tricarboxylic acid. The water utilized in Tables I, II and III, that is "OCW," is distilled water containing 50 ppm of active chloride ion. Corrosion rates given in Tables I thru VI were measured on 1010 carbon steel test coupons.

trants were utilized in combination in accordance with the concepts of the present invention, an unexpected and synergistic low corrosion rate of only 16.7 mpy was achieved. Table II shows similar unexpected and synergistic results were obtained when tataric acid was utilized as the sequestrant. Table III shows unexpected and synergistic results were obtained when gluconic acid was utilized. From the above tables, it is apparent that hydroxy phosphono acetic acid (HPA) achieves better corrosion inhibiting results than does 2-phosphonobutane-1,2,4-tricarboxylic acid (PBTC).

The effect of varying the amount of the sequestrant is set forth in Table IV. The composition of Table IV was 18.75 PPM of HPA, 7.5 PPM of PBTC and 3.0 PPM of tolyltriazole.

TABLE IV

DATA BASED ON 72 HR. TESTS IN 3X FCPW* AT 100 ± 2° F.

| CITRIC ACID PPM | CORR. RATE MPY | % INHIBITION |
| --- | --- | --- |
| Control (no treatment) | 36.1 | 0.0 |
| 0 | 27.3 | 24.0 |
| 3 | 18.9 | 47.6 |
| 6 | 12.9 | 64.3 |
| 9 | 11.7 | 67.6 |
| 12 | 9.6 | 73.4 |
| 15 | 9.1 | 74.8 |

*See Table VII

As apparent from Table IV, the corrosion rate was reduced and the inhibition generally increased with the amount of citric acid sequestrant being utilized.

Some effects of the various ingredients is shown in Table V.

TABLE I

48 HR. MPY CORROSION RATES @ pH 7.5 in OCW AT 100 ± 2° F.
ADDITIVES TO STANDARD (OCW) WATER TYPE

| PHOSPHONATE TYPE | PHOSPHONATE 12 PPM | PHOSPHONATE/CITRIC ACID 12 PPM | CITRIC ACID 12 PPM | CONTROL NO ADDITIVE |
| --- | --- | --- | --- | --- |
| HPA | 43.2 | 16.7 | 47.0 | 76.1 |
| PBTC | 78.5 | 37.6 | — | — |

TABLE II

72 HR. MPY CORROSION RATES @ pH 7.5 IN OCW AT 100 ± 2° F.
ADDITIVES TO STANDARD (OCW) WATER TYPE

| PHOSPHONATE TYPE | PHOSPHONATE 12 PPM | PHOSPHONATE/TARTARIC ACID 12 PPM | TARTARIC ACID 12 PPM | CONTROL NO ADDITIVE |
| --- | --- | --- | --- | --- |
| HPA | 44.8 | 19.8 | 56.8 | 76.3 |
| PBTC | 76.2 | 36.1 | — | — |

TABLE III

72 HR. MPY CORROSION RATES @ pH 7.5 IN OCW AT 100 ± 2° F.
ADDITIVES TO STANDARD (OCW) WATER TYPE

| PHOSPHONATE TYPE | PHOSPHONATE 12 PPM | PHOSPHONATE/GLUCONIC ACID 12 PPM | GLYCONIC ACID 12 PPM | CONTROL NO ADDITIVE |
| --- | --- | --- | --- | --- |
| HPA | 43.2 | 29.3 | 51.4 | 74.9 |
| PBTC | 62.8 | 35.1 | — | — |

As apparent from Table I, when no phosphonic acid or sequestrant was utilized, high rates of corrosion, i.e., 76.1 mpy (mils per year) were obtained. Utilization of either the sequestrant, that is citric acid or the phosphonate reduced the amount of corrosion. However, when both the phosphonic acid and the citric acid seques-

TABLE V

DATA BASED ON 72 HR. TESTS IN 3X FCPW* AT 100 ± 2° F.

| PHA | PBTC | TT | CITRIC ACID | MPY | % INHIB. |
| --- | --- | --- | --- | --- | --- |
| — | — | — | — | 36.1 | 0.0 |
| 18.75 | 7.5 | 3 | 9.0 | 11.7 | 67.6 |
| 18.75 | 7.5 | — | 9.0 | 13.8 | 61.8 |

TABLE V-continued

| | | DATA BASED ON 72 HR. TESTS IN 3X FCPW* AT 100 ± 2° F. | | | |
|---|---|---|---|---|---|
| PHA | PBTC | TT | CITRIC ACID | MPY | % INHIB. |
| — | 7.5 | 3 | 9.0 | 34.9 | 3.3 |
| 18.75 | — | 3 | 9.0 | 15.5 | 57.1 |
| 18.75 | 7.5 | 3 | — | 23.6 | 34.6 |

*See Table VII

As apparent from Table V, the deletion of the azole affected the corrosion inhibiting properties only slightly. However, the deletion of the hydroxy phosphono acetic acid had dramatic effects upon the corrosion inhibiting ability of the composition as did the use of citric acid. The deletion of the PBTC compound was not as dramatic as the deletion of the HPA type compound.

A comparative effect of citric acid and gluconic acid as a sequestering agent is shown in Table VI which also sets forth comparative data with Kelig 100, a 9 percent sulfur containing lignosulfonate. The composition utilized in Table VI is the same as utilized in Table IV with the sequestrant being as set forth below.

TABLE VI

| | DATA BASED ON 72 HR. TESTS IN 3X FCPW* AT 100 ± 2° F. | | |
|---|---|---|---|
| SEQUESTERING AGENT | PPM | CORR. RATE MPY | % |
| None | — | 27.3 | 0.0 |
| Kelig 100 | 9.0 | 16.3 | 40.3 |
| Citric | 9 | 11.7 | 57.1 |
| Gluconic | 12 | 13.3 | 51.3 |

*See Table VII

The utilization of the sequestering agents generally produce slightly better results than the use of a highly sulfonated lignin.

The above tests of IV, V and VI were made utilizing water having properties as set forth in Table VII.

TABLE VII

| 3X FCPW ANALYSIS | |
|---|---|
| Total Hardness as CaCO3 | 580 ppm |
| Calcium Hardness as CaCO3 | 384 ppm |
| Magnesium Hardness as CaCO3 | 196 ppm |
| Iron (Soluble) as Fe | — ppm |
| Iron (Total) as Fe | 0.08 ppm |
| Copper as Cu | 0.04 ppm |
| Zinc as Zn | 0.22 ppm |
| Total Alkalinity (M) as CaCO3 | 30.3 ppm |
| Phenolphthalein Alkalinity (P) as CaCO3 | 0.0 ppm |
| Chloride as Cl− | 253.3 ppm |
| Sulfate, as SO4= | 900 ppm |
| Silica, as SO2 | 53.0 ppm |
| Ortho PO4 | 0.4 ppm |
| Total PO4 | 0.7 ppm |
| pH | 7.30 |
| Color | Clear |
| Conductivity, Micromhos @ 25° C. | 2510 |

The effect of utilizing a high sulfur containing lignosulfonate and a low sulfur containing lignosulfonate is set forth in Table VIII.

TABLE VIII

| PHA ppm Active | PBTC ppm Active | 5% S KELIG 32 ppm Active | 9% S KELIG 100 ppm Active | % IMPROVEMENT CaCO3 Solubility* | % INHIBITION Ca4(PO4)2 ppt** |
|---|---|---|---|---|---|
| — | — | — | — | 0 | 0 |
| 2 | — | — | — | 119 | 10 |
| 2 | — | 9 | — | 124 | 18 |
| 2 | — | — | 9 | 138 | 18 |
| — | 2 | — | — | 186 | 14 |
| — | 2 | 9 | — | 194 | 28 |
| — | 2 | — | 9 | 191 | 34 |

*Based on pH stat CaCO3 scale inhibition tests at pH = 8.5, temp. = 120° F.
**Based on Ca3(PO4)3 scale inhibition tests at pH = 8.5, temp. = 150° F., Ca = 100 ppm and PO4−3 = 12 ppm. Kelig 32 and Kelig 100 are sulfur containing lignosulfonates.

As apparent from Table VIII, a high sulfur lignosulfonate containing 9 percent sulfur showed improved solubility when utilized with HPA and improved inhibition when utilized with PBTC.

In calculating and determining the percent of corrosion inhibition, corrosion potentials of 1010 carbon steel test coupons are monitored against a standard calomel reference electrode in a specific water type at 100° F. and at a pH range of 7.5 to 8.0. Corrosion currents corresponding to these potentials are measured against a nichrome wire getter electrode with a zero resistance ammeter at polarization potentials of less than 20 millivolts. Using Faraday's Law, these corrosion currents are converted to total weight loss values. Percent corrosion inhibition levels as shown in the Tables are then calculated using the following expression:

$$\% \text{ Corr. Inhib.} = \frac{\text{Wgt. Loss }(-\text{inhib.}) - \text{Wgt. Loss }(+\text{inhib.})}{\text{Wgt. loss }(-\text{inhib.})} \times 100$$

While in accordance with the patent statutes, the best mode and preferred embodiment has been set forth, the scope of the invention is not limited thereto, but rather by the scope of the attached claims.

What is claimed is:

1. A composition for inhibiting mineral scale and corrosion of metals in water which comprises from about 2 to 30 parts by weight per one million parts by weight of water of a carboxylated phosphonic acid having either formulae:

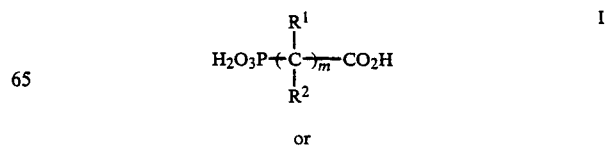

or

-continued

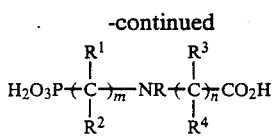

wherein m is from 1 to 6; n is from 0 to 6; $R^1$, $R_2$, $R^3$, and $R^4$, independently, is —H, an alkyl having from 1 to 12 carbon atoms, an aryl or an alkyl substituted aryl having from 6 to 15 carbon atoms, —OH, —SH, —$NH_2$, —$PO_3H_2$, —$CH_2PO_3H_2$, —$CO_2H$, —$CH_2CO_2H$, —halogen, —$SO_3H$; and R is —H, an alkyl having from 1 to 12 carbon atoms, an alkenyl having from 2 to 12 carbon atoms, an alkynyl having from 2 to 12 carbon atoms, a cycloalkyl having from 3 to 16 carbon atoms, an aryl or an alkyl substituted aryl having from 6 to 15 carbon atoms, methylene phosphonic acid, or methylene carboxylic acid; and from about 2 to 30 parts by weight per million parts by weight of water of a sequestrant selected from the group consisting of tartaric acid, citric acid, gluconic acid, and sulfur-containing lignosulfonates.

2. The composition of claim 1 further characterized in that the sequestrant is a sulfur-containing lignosulfonate having from about 7 to 10 percent by weight of sulfur based on the total weight of the sulfonate.

3. The composition of claim 1 further characterized in that the carboxylated phosphonic acid is hydroxy-phosphono acetic acid.

4. The composition of claim 1 further characterized in that the carboxylated phosphonic acid is 2-phosphonobutane 1,2,4-tricarboxylic acid.

5. The composition of claim 1 further characterized in that the carboxylated phosphonic acid is a combination of hydroxy-phosphono acetic acid and 2-phosphono butane 1,2,4-tricarboxylic acid.

6. The composition of claim 1 further characterized in that the sequestrant is a combination of citric acid tartaric acids.

7. The composition of claim 1 further characterized in that the sequestrant is a combination of citric and gluconic acid.

8. The composition of claim 1 further characterized in that the sequestrant is a combination of tartaric acid, citric acid, and gluconic acid.

9. The composition of claim 1 further characterized in that the sequestrant is citric acid.

10. The composition of claim 1 further characterized in that the sequestrant is gluconic acid.

11. A process of inhibiting mineral scale and corrosion of metal in an aqueous system which comprises adding to the water from about 2 to 30 parts by weight per million parts by weight of water of a carboxylated phosphonic acid having either formulae:

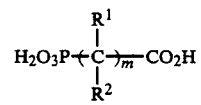

or

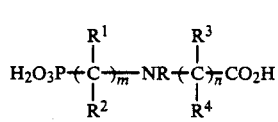

wherein m is from 1 to 6; n is from 0 to 6; $R^1$, $R_2$, $R^3$, and $R^4$, independently, is —H, an alkyl having from 1 to 12 carbon atoms, an aryl or an alkyl substituted aryl having from 6 to 15 carbon atoms, —OH, —SH, —$NH_2$, —$PO_3H_2$, —$CH_2PO_3H_2$, —$CO_2H$, —$CH_2CO_2H$, —halogen, —$SO_3H$; and R is —H, an alkyl having from 1 to 12 carbon atoms, an alkenyl having from 2 to 12 carbon atoms, an alkynyl having from 2 to 12 carbon atoms, a cycloalkyl having from 3 to 16 carbon atoms, an aryl or an alkyl substituted aryl having from 6 to 15 carbon atoms, methylene phosphonic acid, or methylene carboxylic acid; and from about 2 to 30 parts by weight per million parts by weight of water of a sequestrant selected from the group consisting of tartaric acid, citric acid, gluconic acid, and sulfur-containing lignosulfonates.

12. The process of claim 11 further characterized in that the sequestrant is a sulfur-containing lignosulfonate having from about 7 to 10 percent by weight of sulfur based on the total weight of the sulfonate.

13. The process of claim 11 further characterized in that the carboxylated phosphonic acid is hydroxy-phosphono acetic acid.

14. The process of claim 11 further characterized in that the carboxylated phosphonic acid is 2-phosphonobutane 1,2,4-tricarboxylic acid.

* * * * *